United States Patent [19]
Roark et al.

[11] Patent Number: 5,823,069
[45] Date of Patent: *Oct. 20, 1998

[54] RESILIENT HAND GRIP

[75] Inventors: Michael A. Roark, West Allis; James A. Searles, Port Washington; Dale R. Swenson, Wales, all of Wis.; Phillip Downey, LaVerne, Calif.; Scott W. Stonecipher, Kewaskum, Wis.

[73] Assignee: Harley-Davidson Motor Company, Milwaukee, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 583,224

[22] Filed: Jan. 4, 1996

[51] Int. Cl.$^6$ .................................................. B62K 21/26
[52] U.S. Cl. .................................... 74/551.9; 16/DIG. 19
[58] Field of Search ..................... 74/551.9, 558, 74/558.5; 16/DIG. 12, DIG. 18, DIG. 19; D8/303

[56] References Cited

U.S. PATENT DOCUMENTS

| | | | |
|---|---|---|---|
| 1,784,780 | 12/1930 | Bronson | 16/DIG. 18 X |
| 4,416,166 | 11/1983 | Jannard et al. | 74/551.9 |
| 4,837,892 | 6/1989 | Lo | 74/551.9 X |
| 4,843,905 | 7/1989 | Jean | 74/551.9 |
| 4,893,519 | 1/1990 | Corso et al. | 74/551.9 |
| 5,145,082 | 9/1992 | Craft, Jr. et al. | 16/DIG. 12 X |
| 5,595,259 | 1/1997 | Gilliland et al. | 74/551.9 X |

FOREIGN PATENT DOCUMENTS 171002  11/1921  United Kingdom .................. 74/551.9

OTHER PUBLICATIONS

Custom Chrome 1994 Catalog, pp. 504–507.
V–Twin Manufacturing 1994 Catalog, pp. 274–276.

*Primary Examiner*—Charles A. Marmor
*Assistant Examiner*—Mary Ann Battista
*Attorney, Agent, or Firm*—Michael, Best & Friedrich LLP

[57] ABSTRACT

A method of making a hand grip including positioning within a mold cavity a tubular member having a sidewall with at least one opening in the sidewall, and injecting fluid resilient material into the cavity and between the tubular member and a core. The method further includes flowing a portion of the liquid resilient material through the opening to form a raised portion that protrudes through the opening in the tubular member, and curing the resilient material. The flowing step comprises flowing fluid resilient material through both the opening and through the open end, and onto the outer surface of the tubular member adjacent the peripheries of the opening and open end such that the resilient material is mechanically coupled to the tubular member adjacent both the opening and the open end. The resilient material injected into the tubular member has a preselected durometer, and the method further includes forming at least a portion of an end portion from a material having a higher durometer than the preselected durometer.

9 Claims, 2 Drawing Sheets

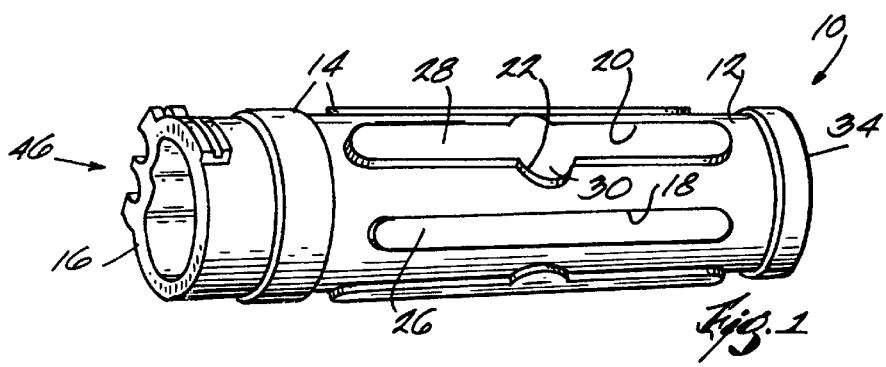
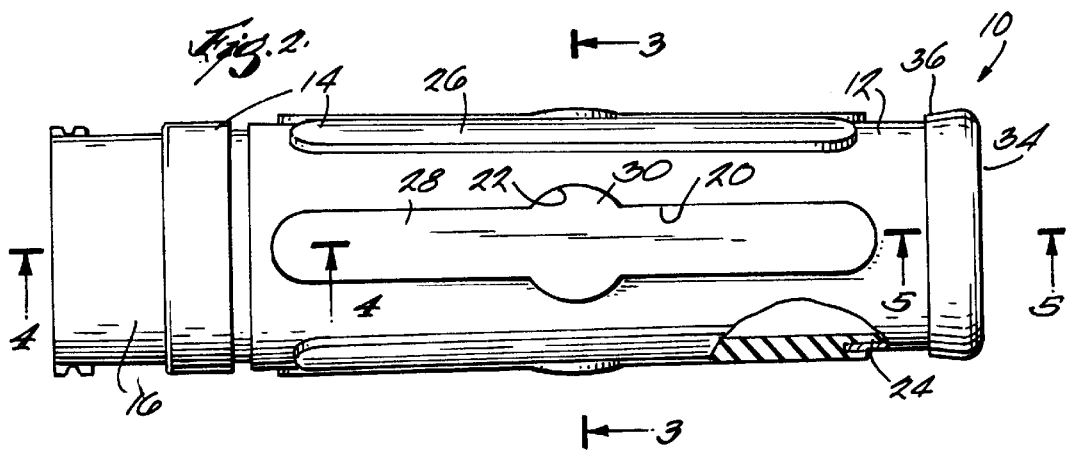
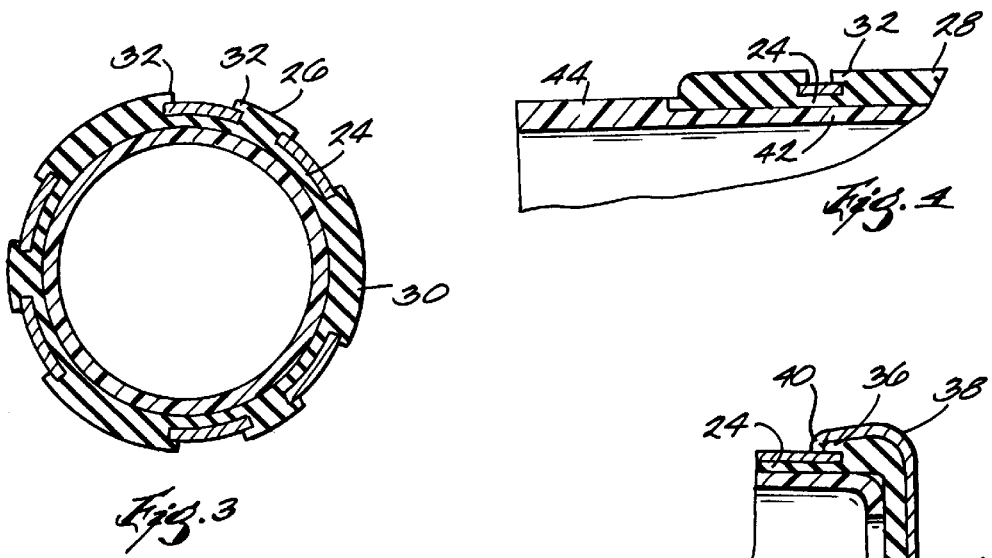
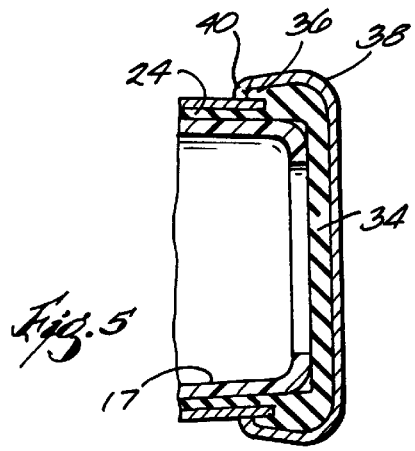

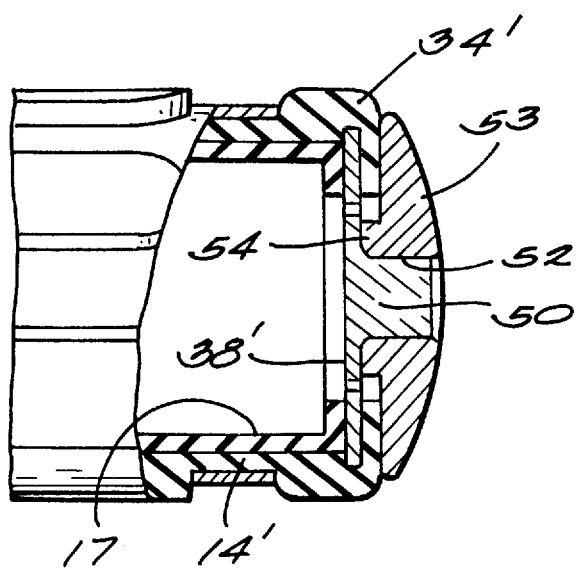

RESILIENT HAND GRIP

FIELD OF THE INVENTION

The present invention generally relates to the field of hand grips, such as for use on a motorcycle. More particularly, the present invention relates to hand grips having a tubular member and a raised resilient portion extending outwardly from the outer surface of the tubular member.

BACKGROUND OF THE INVENTION

Hand grips provide a location for a motorcycle rider to engage and steer the handlebars of a motorcycle while riding. In addition to facilitating steering of the motorcycle, the hand grips typically control the throttle of the motorcycle. For both steering and throttle control functions, it is important for the rider to have secure frictional engagement of the hand grips. In this regard, many motorcycle hand grips are made from high friction resilient material, such as rubber. Resilient materials also provide vibration damping to isolate the rider's hands from the shocks and vibrations transmitted through the handlebars.

In order to enhance the aesthetics of resilient hand grips, some designers include a metal tubular member surrounding a resilient member. The tubular member includes a plurality of openings, and the resilient member includes a plurality of raised portions that are aligned with and extend through the openings. The exposed portion of the tubular member can be chrome plated to provide desired aesthetic effects. The raised portions of the resilient member enhance the friction between the rider's hands and the hand grips. These hand grips are produced by designing the resilient member so that it is radially collapsible and insertable into the tubular member. The resilient member is inserted into the tubular member until the raised portions are aligned with and protrude through the openings.

Hand grips of the above-described type provide desired aesthetics while still providing good frictional characteristics. However, these hand grips can be difficult to manufacture. For example, insertion of the resilient member into the tubular member requires aligning the two members, collapsing the resilient member, and inserting the resilient member into the tubular member until the raised portions are aligned with the openings. These steps can be time-consuming and difficult due to the high-friction characteristics of the resilient member. In addition, because the resilient member must be forced into the tubular member, the height of the raised portions is limited to some extent.

SUMMARY OF THE INVENTION

The present invention solves the above-noted problems by providing a method of making a hand grip that does not require insertion of a tubular resilient member into a tubular member. Instead, the present invention molds the resilient material to the tubular member when the resilient material is in a fluid state. The resilient material can then be cured, thereby resulting in the desired hand grip. By virtue of the present invention, there is no need to force a tubular elastomeric member into a tubular member. In addition, since the elastomeric member is molded to the tubular member, the raised portions can be higher than prior art devices, and can overlap the outer surface of the tubular member to provide enhanced aesthetics and improved coupling of the elastomeric member to the tubular member.

In general terms, the method includes the steps of positioning within a mold cavity a tubular member having a sidewall with at least one opening in the sidewall, and injecting fluid resilient material into the cavity and between the tubular member and a core whereby a portion of the liquid resilient material flows through the opening to form a raised portion that protrudes through the opening in the tubular member, and solidifying (e.g., cooling) the resilient material.

In another aspect, the present invention is directed to a hand grip (e.g., for a motorcycle) that can be produced according to the method described above. In general terms, the hand grip includes a tubular member (e.g., a metallic material) defined by a sidewall having inner and outer surfaces, at least one opening formed in the sidewall, and a tubular resilient member positioned at least partially within the tubular member. The resilient member includes a raised portion that protrudes through the opening in the tubular member and extends over the periphery of the opening and onto the outer surface of the tubular member adjacent the opening (e.g., around substantially the entire perimeter of the opening). By virtue of this design, the resilient member is mechanically coupled to the tubular member.

BRIEF DESCRIPTION OF THE DRAWINGS

FIG. 1 is a perspective view of a hand grip embodying the present invention;

FIG. 2 is a side view of the hand grip illustrated in FIG. 1;

FIG. 3 is a section view taken along line 3—3 in FIG. 2;

FIG. 4 is a section view taken along line 4—4 in FIG. 2;

FIG. 5 is a section view taken along line 5—5 in FIG. 2 with an end cap installed on the hand grip; and FIG. 6 is a sectional view of an alternate emodiment of the invention.

DETAILED DESCRIPTION

FIGS. 1 and 2 illustrate a hand grip 10 embodying the present invention. The illustrated hand grip 10 includes a tubular member 12, a resilient member 14 positioned within the tubular member 12, and an insert member 16 positioned within the resilient member 14. The insert member 16 is specifically designed to be mounted onto the handlebars 17 (see FIGS. 5 and 6) of a motorcycle (not shown).

The illustrated tubular member 12 is made from chrome-plated steel and has a round cross-section. It should be appreciated, however, that other materials could also be used, such as stainless steel or aluminum. Further, the tube could have a different shape cross-section, such as square, hexagonal, oval or other appropriate shape. The tubular member 12 is open at both ends, and also includes six openings 18,20 in the sidewall thereof. The illustrated openings 18,20 are longitudinally-extending slot-like openings having rounded ends, and extend axially (i.e., parallel to the center axis of the tubular member) along the length of the tubular member 12. Three alternately-spaced narrow openings 18 have a width of about 5.0 mm, and the other three wide openings 20 have a width of about 7.5 mm. The wide openings 20 each further include an enlarged round aperture 22 positioned in a middle of the opening and having a diameter of about 14 mm. The round apertures 22 provide a location for a product name or company logo to be placed on the resilient member, as described below. It should be appreciated that the openings could be sized, shaped and oriented in many different ways to achieve desirable aesthetic characteristics. For example, the openings could extend circumferentially around the tubular member, or extend obliquely relative to the tube.

The illustrated resilient member 14 includes a cylindrical body portion 24 positioned within the tubular member 12. The resilient member 14 is preferably made from a material that will dampen vibration and improve frictional engagement with the hand grip. For example, an elastomeric material could be used. In the illustrated embodiment, the resilient member 14 is made from a thermoplastic rubber called Kraton which is styrene-ethylene/butylene-styrene copolymer compound.

A plurality of raised portions 26,28 extend radially outward from the body portion 24 and through the openings 18,20. The raised portions 26,28 are sized and shaped to substantially match the corresponding openings 18,20. The three alternately-spaced narrow raised portions 26 are about 6.0 mm wide, and the other three wide raised portions 28 are about 8.5 mm wide. The wide raised portions each include a centrally-located round portion 30 having a diameter of about 15 mm. The round portion 30 provides a location for a product name or logo. The illustrated raised portions 26,28 each extend radially beyond the tubular member 12 by about 1.5 mm.

The raised portions 26,28 each include an overlapping lip 32 around the perimeter thereof, as shown in FIGS. 3 and 4. Each overlapping lip 32 extends over the periphery of the corresponding opening and onto the outer surface of the tubular member adjacent the opening such that the resilient member 14 is mechanically coupled to the tubular member 12. That is, each raised portion 26,28 is held into the corresponding opening due to the overlapping lip 32 extending over the outer surface of the tubular member 12. The overlapping lips 32 in the illustrated design extend around the entire perimeter of the openings. In this manner, the edges of the openings are hidden from view.

The resilient member 14 further includes an end portion 34 that extends axially from the body portion 24 and through the open end of the tubular member 12. The end portion 34 includes an annular lip 36 that extends around the open end and onto the outer surface of the tubular member 12 adjacent the open end such that the resilient member 14 is mechanically coupled to the open end, as shown in FIG. 5. That is, the end portion 34 is mechanically locked onto the open end of the tubular member 12 to thereby inhibit the tubular member 12 from sliding off the resilient member 14. The illustrated annular lip 36 wraps around the entire circumference of the tubular member 12 adjacent the open end. In this manner, the edges of the open end are hidden from view.

According to this embodiment, the end portion 34 may be made from a material that has a higher durometer (i.e., is less resilient) than the rest of the resilient member 14. For example, the end portion 34 could be made from a thermoplastic material. The use of a less resilient material for the end portion 34 facilitates insertion of the end portion 34 into a cup-shaped end cap 38 (FIG. 5). The end cap 38 is a rigid member (e.g., chrome-plated steel) that includes an inwardly-extending annular flange 40 that engages the annular lip 36 on the end portion 34. The annular flange 40 has an inner diameter that is smaller than the outer diameter of the end portion 34. In this regard, insertion of the end portion 34 into the end cap 38 results in some deformation of the end portion. It has been found that, if the end portion 34 is too resilient, the end portion 34 deforms too much during insertion into the end cap 38, resulting in the end cap 38 being improperly installed onto the end portion 34. On the other hand, highly-resilient raised portions 26,28 are desirable for comfort to the rider's hands. Accordingly, the end portion 34 is desirably made from a less resilient material than the raised portions, thereby facilitating installation of the end cap.

The insert member 16 includes a cylindrical portion 42 positioned within the resilient member 14, and a collar portion 44 extending from one end of the cylindrical portion 42. The collar portion 44 is provided with standard engagement means 46 (FIG. 1) for engaging a throttle cable (not shown) and an idle cable (not shown). The illustrated insert member 16 is made from a rigid plastic material, such as nylon.

The above-described hand grip is manufactured using an injection molding process that molds the resilient member into and around the tubular member. More specifically, the process starts by loading the tubular member into an appropriate injection molding mold (not shown). The mold is closed, and resilient material is injected into the mold in a fluid state. For example, if the resilient material is a thermoplastic, such fluid state can be accomplished by heating the resilient material above its melting point. Alternatively, if the resilient material is a thermosetting plastic, the resin precursor is injected.

During the injection process, the fluid material flows into the tubular member and through the openings in the tubular member to form the raised portions. In addition, fluid material flows through the open end of the tubular member to form the end portion. The mold limits the flow of the fluid material to thereby form the overlapping lips and the annular lip. The fluid material is then solidified (e.g., cooled or cured) and removed from the mold with the tubular member to form a hand grip having the features of the present invention. As used herein, the term "solidified" means to make more viscous. The insert member is subsequently bonded into the elastomeric member to produce the illustrated hand grip. If desired, the end cap can be installed over the end portion.

FIG. 6 shows an alternate embodiment of the invention wherein the resilient member 14' is generally homogeneous throughout. A circular end plate 38' formed of a suitable material, such as metal or plastic, is molded into the end portion 34. The plate 38' bears against the end of the insert member 16 and the molded rubber end of portion 34 extends over the periphery of plate 38'. A threaded stud 50 extends perpendicularly from the center of plate 38' for receiving an internally threaded hole 52 in an end cap 53. The end cap includes a planer base portion 54 which surrounds the hole 52 and engages the plate 38'.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A hand grip comprising:
   a substantially rigid tubular member having a sidewall having inner and outer surfaces, and at least one opening formed in said sidewall; and
   a resilient member that is softer than said tubular member, said resilient member having a tubular portion positioned at least partially within said tubular member, said resilient member including a raised portion that protrudes through the opening in the tubular member and extends over the periphery of the opening and onto the outer surface of the tubular member adjacent said opening.

2. A hand grip as claimed in claim 1, wherein said raised portion extends around substantially the entire perimeter of said opening.

3. A hand grip as claimed in claim 2, wherein said tubular member includes an open end, and wherein said resilient member includes an end portion that protrudes through said open end and extends around said tubular member and onto the outer surface of the tubular member adjacent the periphery of the open end.

4. A hand grip as claimed in claim 3, wherein said resilient member has a preselected durometer, said end portion having a higher durometer than said preselected durometer.

5. A hand grip as claimed in claim 4, wherein said tubular member is formed of a metallic material.

6. A handlebar assembly, comprising:
  a handlebar having a first inner portion and a second free outer end opposite the first portion; and
  a hand grip interconnected with the handlebar adjacent the second end of the handlebar, the hand grip including:
    a substantially rigid tubular member having a sidewall having inner and outer surfaces, said tubular member including an inner end disposed a first distance from the second end of said handlebar and an opposite outer end disposed a second distance from the second end of said handlebar, the first distance being greater than the second distance, and
    a resilient member having a tubular portion positioned at least partially within said tubular member, wherein said resilient member includes an end portion that protrudes through said outer end of said tubular member, extends around said tubular member and onto said outer surface adjacent said outer end of said tubular member, and extends across the second end of said handlebar.

7. A handlebar assembly as claimed in claim 6, wherein said end portion of said resilient member covers said outer end of said tubular member and thereby substantially closes said outer end.

8. A handlebar assembly as claimed in claim 6, wherein said resilient member has a preselected durometer, at least a part of said end portion having a higher durometer than said preselected durometer.

9. A handlebar assembly as claimed in claim 8, wherein said tubular member is formed of a metallic material.

* * * * *